March 16, 1937.　　　　E. E. BECKMAN　　　　2,073,603
ELECTRIC WELDING MACHINE
Filed Dec. 24, 1935　　　3 Sheets-Sheet 1
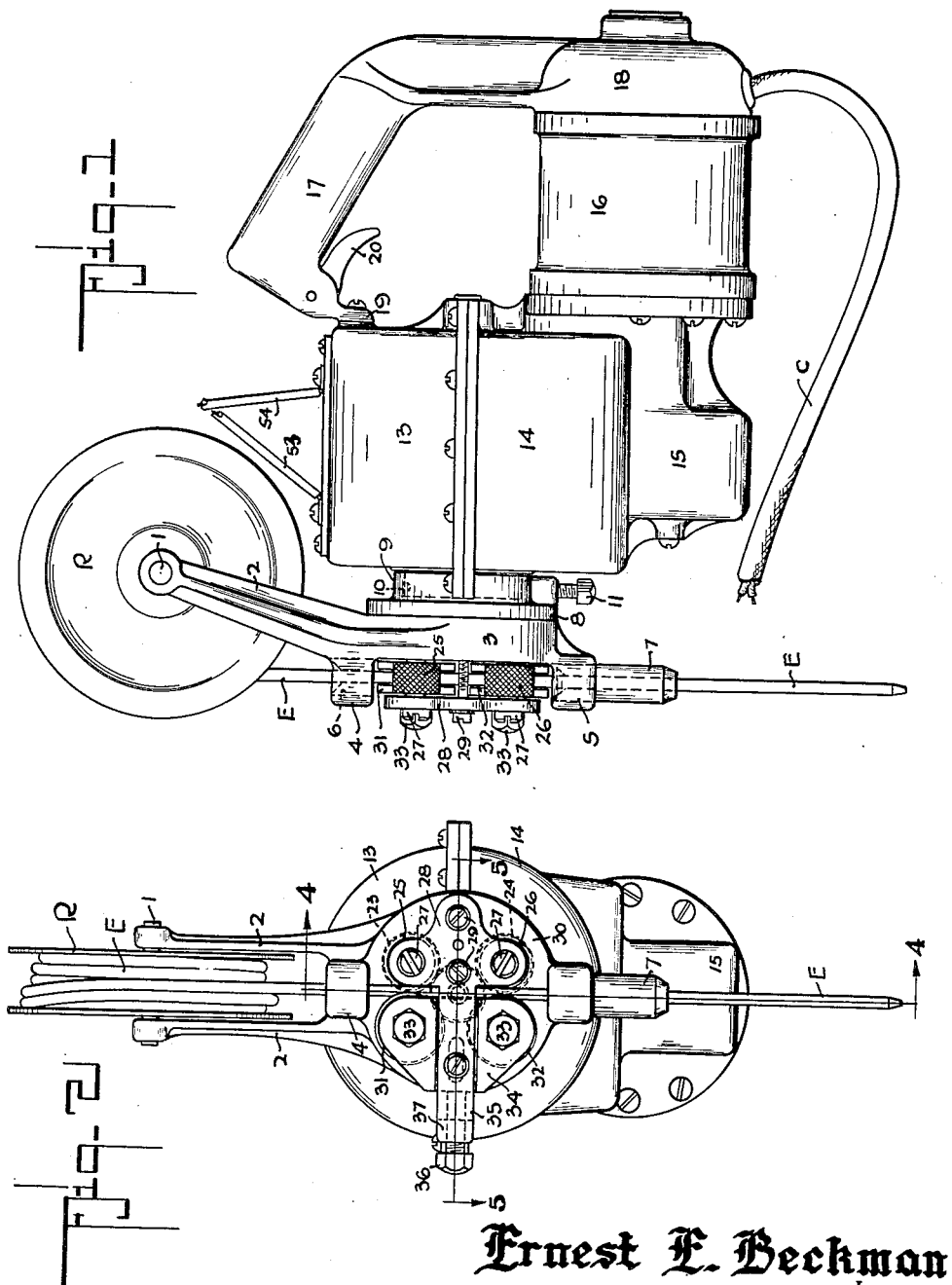
Ernest E. Beckman
Inventor
By Herbert E. Smith
Attorney

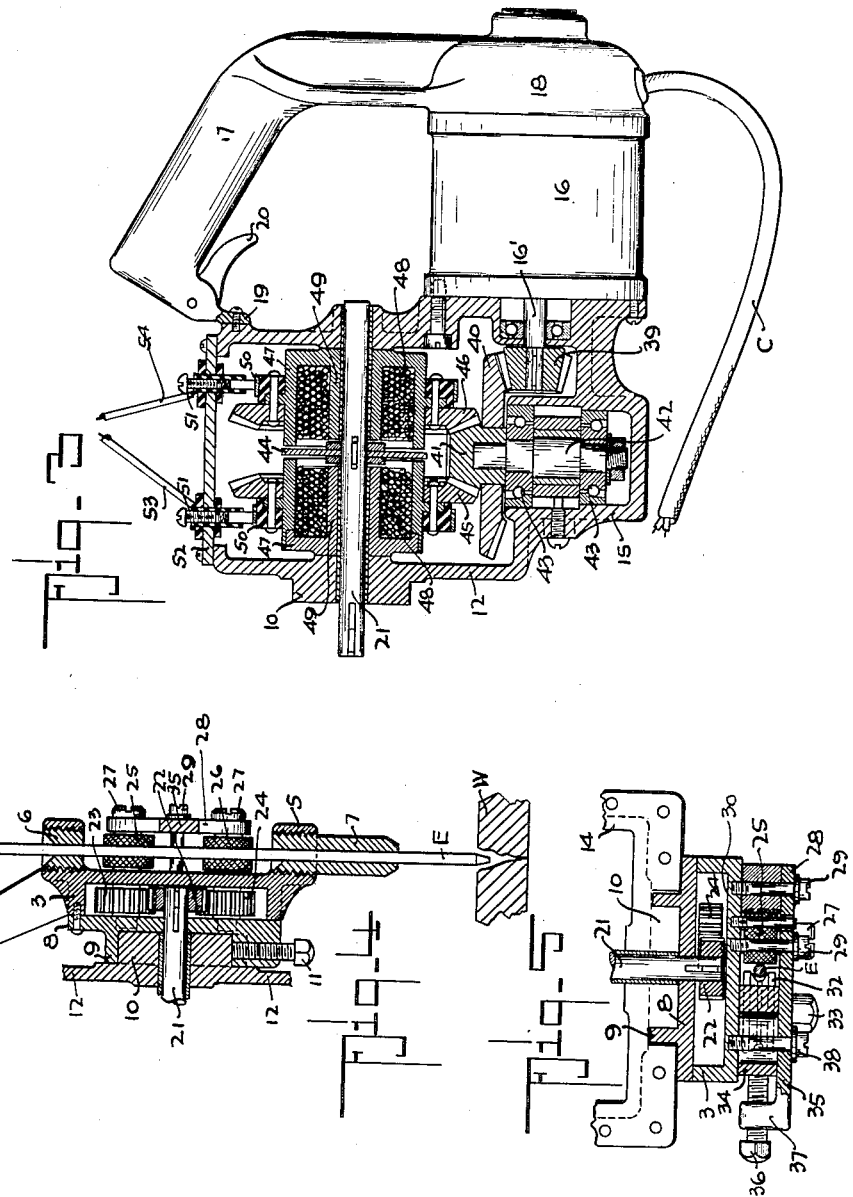

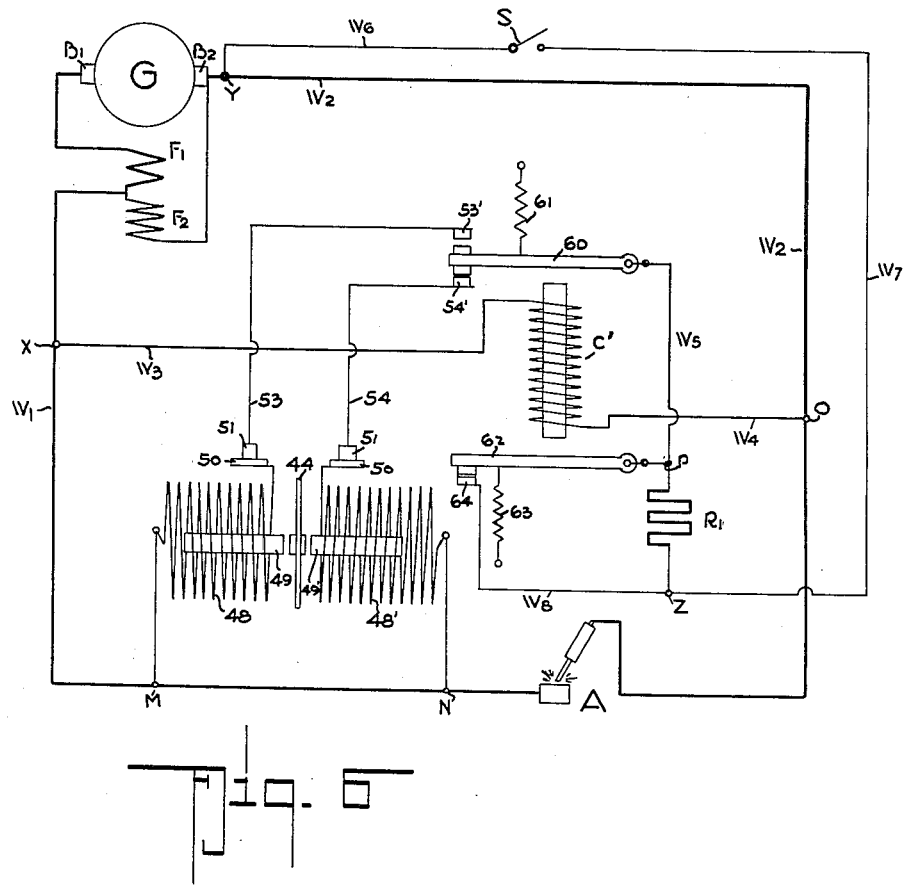

Patented Mar. 16, 1937

2,073,603

UNITED STATES PATENT OFFICE 2,073,603

ELECTRIC WELDING MACHINE

Ernest E. Beckman, Lind, Wash., assignor of one-half to Walter D. Krehbiel, Lind, Wash.

Application December 24, 1935, Serial No. 56,054

2 Claims. (Cl. 219—8)

My present invention relates to an improved electric welding machine by means of which an arc of predetermined characteristics or electrical value may uniformly and automatically be maintained during the welding operation of the machine, thus relieving the operator of the necessity for controlling the feed of the electrode, and permitting him to devote his attention solely to the manipulation of the portable machine in its relation to the work, and to the progress of the welding operation.

In the present exemplification of the invention I have illustrated a portable, power operated machine, having mechanical feed mechanism that is electrically and automatically controlled. In lieu of the illustrated hand-machine, it will be understood that the invention may be embodied in other types of machines for the purpose of electric arc welding.

By the utilization of my invention as herein illustrated I provide electrical means for automatically controlling the feed of the electrode or welding wire to compensate for variations in the length of the arc or gap at the welding point, and thereby I maintain the characteristics or electrical values with uniformity and accuracy, to insure an even flow of metal and a perfect fusion at the welding point. The feed or travel of the electrode in either forward or reverse direction is initiated and accomplished with facility, and the feed mechanism is positively operated to overcome inertia of the parts of the feeding mechanism, without appreciable time lag.

As heretofore practised, electric arc welding has depended upon the skill of the operator to maintain the proper arc characteristics, in an endeavor to secure an even flow of the metal and good fusion, but this manual control frequently allows the arc to be lengthened beyond the proper welding point, and as a result, the metal is burned; on the other hand, if the gap or arc is shortened as frequently occurs, the electrode forms uneven deposits with imperfect fusion of the metals to be welded. In actual practice an arc of say twenty volts requires the maintenance of a one-eighth inch gap or arc-length. If the gap, due to imperfect manipulation of the operator is lengthened to say five-thirty-seconds of an inch, the consumption of electrical current across the gap is reduced, but the circuit connected at opposite sides of the arc points is called upon to bear an excess load, above the normal. If the arc-length is shortened from one-eighth of an inch to say three-thirty-seconds of an inch, a lesser resistance to the electrical current is set up at the arc, and a greater than normal flow of current appears in the welding circuit.

In carrying out my invention I utilize these increases and decreases of electrical current that frequently occur in the welding circuit during the welding operation, to automatically control, advance, or retract, the electrode or welding wire, to compensate for the variation in the arc length. This automatic control is accomplished through the use of a relay circuit and a forward drive clutch and reverse drive clutch.

The machine here illustrated is designed for welding long joints, as between two sheets of metal in the construction of a tank, or it is adapted for welding the adjoining edges of a longitudinally split pipe, and in similar construction joints, where the welding operations are substituted for riveting operations, for the same purpose. The machine as thus embodied is comparatively light in weight, the driving and feed mechanisms are compactly arranged, and the whole portable operating unit may be manipulated with facility during the welding process.

While I have shown the welding wire or electrode coiled upon a reel, and the portable unit or "hand" machine is adapted for work at points remote from the source of electrical supply or power, it will be understood that other types of electrode may be fed by the feeding mechanism; the machine itself may be operated as a stationary machine; and other changes and alterations may be made within the scope of my claims, without departing from the principles of my invention.

The invention consists in certain novel combinations and arrangements of parts involving the feeding mechanism and the driving or operating mechanism as will hereinafter be more fully set forth and claimed. In the accompanying drawings I have illustrated one complete example of the physical embodiment of the invention in a portable, electrically operated, electrical arc-welding machine.

Figure 1 is a view in side elevation of a welding machine embodying my invention.

Figure 2 is a face view as seen from the left in Figure 1.

Figure 3 is a side view of the machine, with parts broken away, and showing in detail-section the driving mechanism and the magnetic-clutch mechanism for the operating shaft.

Figure 4 is a detail sectional view of the feed mechanism as at line 4—4 of Figure 2.

Figure 5 is a transverse sectional view of the feed mechanism as at line 5—5 of Figure 2.

Figure 6 is a diagrammatic view of the electrical wiring for the welding machine.

In Figure 4, I have indicated as W the work to be welded, and the welding wire or electrode E is fed thereto from a reel R on which the wire is coiled. The reel R is journaled at 1 in a pair of bracket arms 2, 2, which are rigid or integral with a cylindrical, hollow, feed head 3. The feed head is fashioned with a pair of diametrically alined bosses 4 and 5, and a guide bushing 6 is threaded in bushing 4, while a guide sleeve 7 is threaded in the bushing 5 for accommodating and guiding the electrode as it is fed forward to the work, or as it is retracted from the work, during the welding operation.

An attaching plate 8 for the feed-head is fashioned with an annular flange or collar 9, and as here shown, the plate which is rigid with the head, is attached by its collar 9 on a supporting head 10, and a set bolt 11 passing through a lug on the attaching flange engages the head 10 to fasten the feed-head on the support or supporting head, as seen in Figure 4.

By means of the supporting head 10, attaching flange 9 and the set bolt 11, it will be apparent that the feed-head and its operating parts, may be detachably fastened in operative position for use in feeding the electrode during the welding process.

For a portable power tool or machine as illustrated in the drawings, the supporting head 10 is fashioned rigid, or integral with an end-plate 12 of a sectional cylindrical housing comprising the flanged sections 13 and 14 that are bolted together, and the section 14 is shown as integral with a gear casing 15, to which the electric motor 16 is attached. Electrical current is supplied to the motor through wires or cable C, and a handle 17 is shown in Figures 1 and 3 having an attaching cap 18, fastened at the outer free end of the motor, and also attached at 19 to the housing section 13. The housing and the motor are disposed in planes at approximately right angles, and the angularly disposed handle 17 provides a finger space to insure convenience in grasping the handle in one hand for manipulation of the power tool. A switch lever 20 is pivoted in the handle in position readily accessible to one of the fingers of the operator which through the lever may control the supply of current to the motor for operating the latter.

An operating shaft 21 for the feed mechanism is journaled in the housing 13—14 in a plane parallel with the axis of the motor shaft 16', and driving and transmission mechanism are interposed between the motor shaft and the operating shaft for revolving the latter, as will be described.

One end of the operating shaft projects through the housing and as best seen in Figures 4 and 5, an operating pinion 22 is rigidly mounted on this shaft 21 and forms the prime mover of the rotary feed mechanism for the electrode, it being understood that the operating shaft 21 and its operating pinion 22 are reversible in their rotary movement.

The operating pinion 22 is in constant mesh with two spaced feed pinions 23 and 24 which of course revolve in reverse direction from the operating pinion. Each of these feed pinions is rigid or integral with a feed-roller or friction drive roller, as 25 and 26 which are provided with friction faces, or knurled, as indicated for engagement with the electrode E.

These feed devices 23—25 and 24—26 are mounted to revolve on studs 27, 27 which are passed through an outer mounting-plate 28 which is secured by bolts 29 to a circular face plate 30 of the feed-head 3, and the inner ends of the studs are supported in the face plate.

The two friction feed-rollers 25 and 26 are opposed by a pair of spaced pressure rollers 31 and 32 that are journaled on studs 33, and the studs are mounted in a slidable, slotted bearing block 34, which has a grooved face, and which is interposed between the face plate 30 and an extension arm 35 of the fixed mounting plate 28. The friction feed rollers and the grooved pressure rollers, as indicated are located in the same plane, but at opposite sides of the electrode in order that these feed devices may have a wide bearing against the opposite sides of the electrode for the purpose of advancing or projecting the electrode, and for retracting the electrode from the work W, when required.

The two pressure rollers 31 and 32 are adjustable toward and away from the two friction drive or feed rollers 25 and 26 to vary the degree of frictional engagement of the feed devices against the electrode, and for this purpose the presser rollers are journaled in the adjustable bearing block 34. The slotted, adjustable, bearing block is adjusted or moved toward the friction drive rollers by use of an adjusting bolt 36 which is threaded in a boss 37 integral with the end of the extension arm 35 of the mounting plate 28, and a guide bolt 38 is mounted in the extension arm and projects into the slotted bearing block, to assist the grooved bearing block in its adjusting movement.

It will thus be apparent that the welding wire or electrode E is first uncoiled from the reel R in order that a considerable length of its free end portion may be slipped through the guide boss 6, then passed between the two sets of feed rollers, and finally passed through the long bushing or guide sleeve 7, and the end of the electrode is of course applied to the arc-gap for welding purposes. At all times the end portion of the electrode is held in a straight line as indicated and gripped by the feed rollers, and the electrode is gradually uncoiled from the reel and fed to its work. If and when desired or required, the electrode, still in the grip of the two sets of feed rollers, may be retracted from the work W.

The reversible operating shaft 21 and its operating pinion 22 are driven from the motor shaft 16' of the electric motor 16 through a train of driving gears operated from the driving pinion 39 on the motor shaft, which pinion, as here shown is of the bevel type. This drive pinion meshes with a large bevel gear 40, and the latter is fashioned with a reduced bevel pinion 41, both gears 40 and 41 being rigid with the stud shaft 42 that is disposed in a plane at right angles to the motor shaft, and the shaft is journaled in antifriction or ball bearings 43, spaced apart and mounted in the gear case 15.

The pinion 41, when revolving, transmits motion constantly to two magnetic clutches that revolve loosely on the operating shaft 21, and these clutch devices may alternately be electrically energized to revolve in opposite directions with the operating shaft, in connection with a magnetic disk 44 that is rigidly mounted on the operating shaft between the two magnetic clutch devices or members. For this reversing and forward movement or rotation of the operating shaft, each magnetic clutch member is provided with a bevel gear ring, as 45 and 46, which gear rings constantly mesh with, but are located at opposite sides of the bevel pinion 41, so that they revolve in opposite directions.

The clutch devices are located at opposite sides of the armature disk 44, and each device includes a cylindrical shell 47 on which shells the gear rings 45 and 46 are rigidly mounted. The shells each enclose a magnetic coil 48 and each shell is fashioned with a hub 49 loosely journaled on the operating shaft 21, the magnetic clutch members being disposed in close proximity to the opposite sides of the armature disk in order that the clutches, or magnetic clutch devices may, separately, be attracted, or magnetically connected to the armature disk.

Each magnet has an annular conductor ring 50 mounted on its exterior periphery, and these rings are frictionally and electrically engaged by brushes and terminals indicated at 51 in Figure 3. The brushes and terminals are mounted on a removable plate 52 that is bolted to the housing section 13, and wires 53 and 54 connected to the terminals form part of a circuit having a shunt relay with suitable switches, and the latter are separately operated in the electric circuit, for the purpose of energizing a selected magnet to cause rotation of the operating shaft in a desired direction. When a solenoid or magnet of the clutch devices is energized, the clutch member of which it forms a part is magnetically connected, by attraction with the armature 44, and as the magnet-members of the clutches are constantly revolving, when the motor is operating the operating shaft, through the electrically connected armature disk 44, is caused to revolve with the energized magnet.

For feeding the feed rolls 25 and 26 counterclockwise in Figure 2 to advance the electrode E, the shaft 21 is revolved clockwise through ring gear 46 receiving power from the pinion 41, at which time the magnet or solenoid of gear ring 46 is energized. For a clockwise turning of the feed rollers and consequent retraction of the tip end of the electrode from the work, the operating shaft is turned counter-clockwise through ring gear 45 when its solenoid is energized.

Various changes and alterations may be made in the feed mechanism; in the operating mechanism; and in the combinations of these parts in the machine. For instance, the guides 6 and 7 for the electrode may be of different sizes and shapes and employed to guide the free end portion of the wire forming the electrode, and this free end portion may assume a curve shape. The guides may be insulated on their exteriors, and one or both of them may be lengthened as desired for use when the arc gap is located at a remote distance from the feed device. Or the guides, or one of them, may be flexible in order that the electrode may be guided around an obstruction to the arc gap. The feed roll mechanism may readily be removed from the driving and power transmitting mechanisms and interchanged for use with other sets of feed rolls in order to accommodate any appropriate type of electrode, such as a carbon or other large electrode.

In the wiring diagram of Figure 6, the several circuits and electrical connections for the welding machine are illustrated, including by symbols some of the mechanical parts. The main welding circuit includes the generator G, and the lead wires W1 and W2; the relay circuit starts at X on the wire W1; a safety circuit for the relay starts at Z; and the two magnetic clutch circuits connected with clutches 48 and 48' for control of the electrode start at Y on wire or conductor W2.

The coils 48 and 48' are separately energized by means of an armature or circuit maker 60 which is held under tension by spring 61, and the armature oscillates between the points 53' and 54' to which the wires 53 and 54 of the two magnetic clutches are connected. The armature is of a double contact type, and when the current in coil C' is lowered sufficiently to de-energize its magnetic core, the spring 61 draws the armature in contact with point 53' of wire 53. The current then flows through brush 51 and conductor ring 50 of the magnetic clutch 48, and joins the conductor wire W1 at M. Now, if the length of the arc at A is increased beyond the proper distance, the additional power flowing across the relay circuit, as will be described, charges the coil C' causing the coil to attract the armature 60 into contact with point 54', thereby energizing the magnetic clutch 48'. As a result the armature 44 is drawn to the right in the diagram, and the feed mechanism, actuated by shaft 21, operates to force, expel, or extrude the electrode E. and thus restore the arc or welding gap to its characteristic-distance.

If, on the other hand, the arc at A is shortened to less than the characteristic length, the flow of current across coil C' is less than the mean or average, and the spring 61 then attracts armature 60 into contact with contact point 53', thus energizing the coil of the magnetic clutch 48, reversing the rotary movement of shaft 21, and the feed rolls are caused to retract the electrode E for the purpose of restoring the proper characteristic-length of the arc or welding gap, at A.

In the diagram, the welding circuit may be traced from the generator G through brush B' and field coil F', thence through conductor wire W1 to the work side of the arc A; thence across the arc to the electrode side of the gap and through conductor W2 back to the brush B2 and generator G; and as indicated a shunt field winding F2 is connected between the field coil F' and the brush B2.

As the efficient operation of the welding machine is dependent upon the automatically operated electric controls for the two electromagnetic clutches, which, through the feed mechanism, extrude and intrude the electrode to maintain the desired arc characteristic, I utilize a relay circuit which receives its electrical energy due to changing conditions, or electrical surges, caused by the lengthening or shortening of the arc gap. This lengthening or shortening of the arc may be caused by irregularities in the surface to be welded which cause variations in the gap between the electrode E and the work; and also, the consumption of the electrode E lengthens the gap. If the operator has chosen a 20-volt circuit to work with, and the gap becomes longer, or too long to work with this current in the welding circuit, an increased flow of electricity moves across the relay circuit, causing energization of one of the magnetic clutches, with the result heretofore described. If the arc is shortened, the flow of electricity across the relay circuit decreases, allowing spring 61 to draw the armature 60 into contact with point 53', establishing another circuit that operates the other magnetic clutch, to drive the feed mechanism as described.

This relay circuit may be traced from conductor W1 of the welding circuit, at X, through wire W3, through coil C' to the wire W4, which is connected at O to the other conductor W2 of the welding circuit, and as indicated, the coil C', when energized, is the operating means in combination with armature 60 of this compensating relay.

The magnetic clutch circuit, which controls the feed of the electrode E, may be traced from point Y of the conductor W2 of the welding circuit, through wire W6 and the switch S to wire W7, across contact Z to the wire W8, and then through contact 64 and an armature 62 to the contact point P of the wire W5, thence into the armature 60 and to contact 54' of the wire 54, and to the brush 51 that contacts with the conductor ring 50 on the outside of the magnetic clutch coil 48', and finally joins the other conductor W1 of the welding circuit at N.

A safety circuit is also shown, which is used for protection of the magnetic coils 48 and 48' of the clutches, which coils are comparatively light in weight and very sensitive, and this safety circuit is employed in connection with the magnetic clutch circuits that control the electrode. The safety circuit may be traced from point Y on the conductor W2 over wire W6 to the switch S, and wire W7 to the point Z of the magnetic clutch circuit, thence across resistance R1 and contact point P to wire W5 of the magnetic clutch circuit, and thence, as shown in the diagram out through coil 48' of the clutch. Now assuming that the operator draws his welding machine away from the work and thereby lengthens the arc to such extent that the entire load of the generator is thrown upon the relay circuit, as described, the relay circuit charges the coil C' to an abnormal condition or degree sufficiently to overcome the spring 63 of the relay armature 62, breaking contact with 64. The overload now flows through resistance R1 and is thereby consumed, thus protecting the magnetic clutch coils, which might otherwise be burned by the excessive current.

When either of the magnetic clutches 48, 48' is energized, the armature 44 becomes a part of the magnetic circuit that is energized, and the operating shaft 21 is revolved in the selected direction determined by the shunt relay circuit, with least possible inertia of the operating parts, to extrude or to intrude the electrode E.

Having thus fully described my invention, what I claim as new and desire to secure by Letters Patent is:—

1. Control means for an arc welding machine when the arc is abnormally lengthened comprising a welding circuit and a shunt relay circuit, electrode-feed mechanism and operating means therefor including an electro-magnetic clutch, an electrode feed mechanism control circuit connected to said welding circuit at opposite sides of the arc and a coil in the relay circuit controlling said electrode feed mechanism control circuit, an auxiliary circuit connected with said electrode feed mechanism control circuit, and means within said auxiliary circuit under control of the relay circuit for preventing an excess current from reaching said clutch.

2. Control means for an arc welding machine when the arc is abnormally lengthened comprising a welding circuit and a shunt circuit, electrode feed mechanism and operating means therefor including an electro-magnetic clutch, an electrode feed mechanism control circuit connected to said welding circuit at opposite sides of the arc and a coil in the relay circuit, controlling the electrode feed mechanism control circuit, an auxiliary circuit connected with said electrode feed mechanism control circuit and including a resistor, and a circuit breaker in the electrode feed mechanism control circuit under control of said coil preventing an excess current from reaching said clutch.

ERNEST E. BECKMAN.